March 15, 1966    R. L. McDONALD ETAL    3,240,959

TEMPERATURE CONTROLLED TIMING APPARATUS

Filed May 14, 1962

INVENTORS.
ROBERT L. McDONALD
ALVIN F. BERNREUTHER
BY Thomson, Roessel
& Schnee

ATTORNEYS

United States Patent Office 3,240,959
Patented Mar. 15, 1966

3,240,959
TEMPERATURE CONTROLLED TIMING
APPARATUS
Robert Louis McDonald, Rochester, and Alvin F. Bernreuther, Macedon, N.Y., assignors to Wilmot Castle Company, Rochester, N.Y., a corporation of New York
Filed May 14, 1962, Ser. No. 194,496
9 Claims. (Cl. 307—117)

This invention relates to temperature responsive timing apparatus and particularly apparatus of this nature adapted for timing a sterilizing cycle of a sterilizer.

It is one object of our invention to provide improved apparatus of the above described nature.

Recently, temperature controlled timing apparatus, particularly suited for use with sterilizers, have been developed for controlling the supply of current to the timer based on temperature variations. Known devices of this nature include a periodic circuit interrupter comprising a bi-metallic strip responsive to a resistance coil heater for making and breaking the circuit to the timer. The resistance coil heater is ideally controlled by a constant source of energy. However, this type of interrupter is subject to error by reason of fluctuations in the line voltage to the resistance coil heater.

Therefore, it is one object of our invention to provide a temperature controlled timing apparatus which is more accurate than heretofore known devices.

It is another object of our invention to provide temperature controlled timing apparatus which is not subject to inaccuracies due to variation in line voltage.

In the past, apparatus generally of the nature of this invention have been subject to further inaccuracies due to uncompensated ambient temperatures of a bellows, internally responsive to the sterilizer chamber or source of heat; the bellows provided time adjustments, responsive to temperature variations at the source, through control of the interrupter.

Therefore, it is a further object of our invention to provide apparatus compensating for such inaccuracies resulting from prior known apparatus.

It is a further object of our invention to provide a cam interruptor controlling the current to the timer having a contour of selective configuration cooperating with a temperature sensitive switch, in circuit with the timer, for prolonging a predetermined sterilizing period sufficient to affect sterilization at a corresponding decrease in temperature in the sterilizing chamber or at the heat source.

It is a further object of our invention to provide simpler less expensively manufactured temperature controlled timing apparatus.

Other objects and advantages of this invention will be particularly set forth in the claims and will be apparent from the following description, when taken in connection with the accompanying drawings, in which:

The apparatus according to our invention will hereinafter be generally referred to as a time-temperature integrator. As used in the specification and claims hereinafter, the terms "temperature sensitive" or "temperature responsive" shall be construed to include "pressure sensitive" and "pressure responsive" apparatus because under otherwise normal conditions pressure is proportional to the temperature.

Broadly, our invention includes, a timing device for affecting a control operation or indication of termination of a sterilizing cycle after a predetermined time period or interval; a switch controlling the supply of energy to the timer; a device responsive to temperature in the sterilizing chamber during the predetermined interval operatively moving the switch; and a cam co-acting with the temperature responsive device to control the switch, thereby to adjust the predetermined period in accordance with variations in temperature within the chamber.

The time-temperature integrator according to our invention is applicable, for example, to the control of a sterilizing cycle so that in the event the chamber temperature drops below a preselected maximum temperature, the sterilizing time is correspondingly prolonged.

The basic problem solved by our invention is accurately prolonging the sterilization time as needed to affect complete sterilization of the goods within the sterilizer chamber proportional to temperature variations below a preselected maximum.

Figure 1:
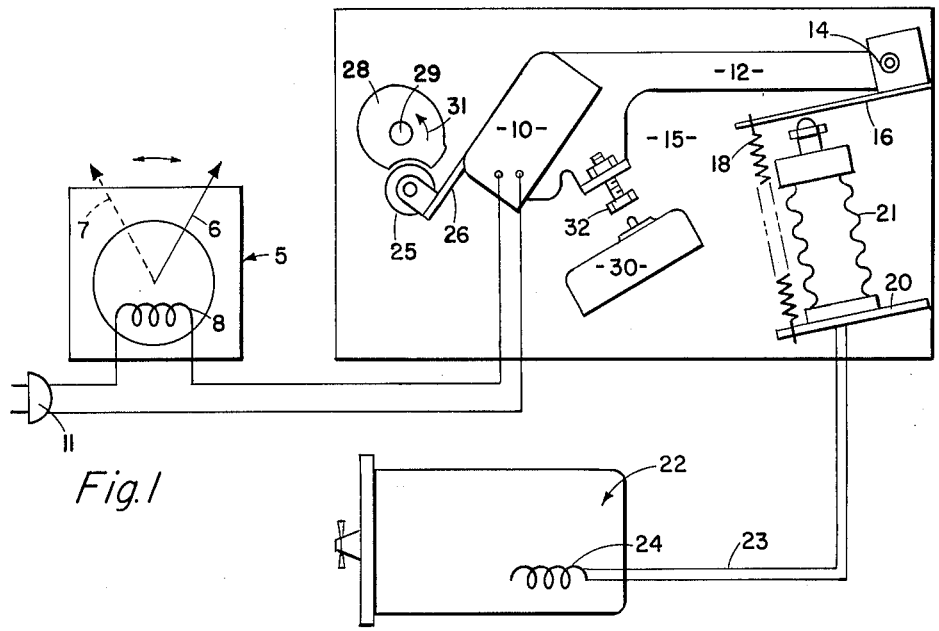
FIG. 1 is a schematic view of one embodiment of our invention.

With reference to FIG. 1, we have diagrammatically illustrated a timer generally indicated by the numeral 5, having a pointer 6 moving in a counter-clockwise direction from a starting position shown in solid line at 6 to a finished timing position illustrated at 7 in broken line. The timer 5 is set to time an interval of, for example, three minutes, which is the necessary sterilization time at 275° F. The movement of the pointer 6 is controlled by the motor coil 8 of the timer 5. A normally open switch 10 is in series with the motor coil windings 8, and switch 10 and coil 8 are across a 115 v. line supplied current through an electrical plug 11 adapted to be received in any 115 v. receptacle.

Switch 10 is carried on an arm 12, pivotally mounted at 14 on a support plate 15. Arm 12 carries a bimetallic strip extension 16 biased in a counter-clockwise direction with respect to pivot 14 by a tension spring 18, intermediate extension 16 and a support member 20. Support member 20 being rigidly mounted to plate 15, carries a bellows 21 internally exposed through a conduit 23 and a thermo bulb 24 to temperature variations in a sterilizing chamber 22. Bellows 21 opposes spring 18 to pivot extension 16 and arm 12 in clockwise rotation about pivot 14.

Normally open switch 10 has a follower roller 25 carried by a resilient switch arm 26 which controls switch 10. Normally open switch 10 is closed when follower roller 25 engages the surface of a cam 28 rotatably carried on a shaft 29 of a motor (not shown) rigidly mounted with respect to support member 15. The cam is rotated in a counterclockwise direction as indicated by the arrow 31.

Thus, it will be understood that increased temperature of the chamber 22 causing expansion of the bellows 21 upwardly actuates extension 16 and in turn arm 12 in a clockwise direction about pivot 14. It will be noted that the contour of cam 28 is of varying radii with respect to its rotational axis 29. Thus, the roller 25 engages only a selected portion of the contour of the cam 28 at a given temperature of the chamber 22 per revolution of the cam 28, thereby to close the normally open switch 10 for an established period of time per revolution. Hence, the time-off period of the timer 5, during which the normally open switch 10 does not complete the circuit to the coil 8, and the time-on of the timer 5, during which the normally open switch 10 is closed by engagement of the roller 25 on the surface of the cam 28, are a function of switch 10 being positioned relatively near to the rotational axis 29 of cam 28 for a long time-on period or relatively far from the rotational axis of cam 28 for a short time-on period. This function will be more clearly understood by the detailed description below of the contour of the cam illustrated in FIG. 2.

A re-cycle switch 30 rigidly mounted on support plate 15 is provided in circuit with the timer 5 (circuitry not shown) to re-cycle the timer 5 to the beginning position thereby reinitiate the timing period. This occurs if the temperature in the chamber 22 drops below a preselected minimum sterilizing temperature. If the bellows 21 is retracted by a drop in temperature within the chamber to the preselected minimum temperature, the spring 18 pivots arm 12 counterclockwise about pivot 14 until an adjustable stop 32 carried by arm 12 engages and actuates the re-cycle switch 30.

The bi-metallic extension 16 is responsive to ambient temperature of the bellows 21 and compensates for temperature variations occurring in that area surrounding the bellows 21. This arrangement increases the accuracy of our invention. Slight temperature variations in the surrounding area of the bellows 21 flex the bi-metallic extension 16 slightly in the reverse direction of the corresponding temperature influence on the bellows 21, thereby to compensate for the volumetric variation of the liquid in the bellows.

Characteristically, it takes a total of three minutes sterilizing time when the temperature of the goods to be sterilized in chamber 22 is at 275° F. Whereas, it takes approximately 15 minutes at 250° F. In order to prolong an established time period such as three minutes proportional to the temperature variations at the source, we have provided the cam 28 having a contour of selected varying radial distances with respect to rotational axis 29. Cam 28 is rotated at a selected number of revolutions per minute. The contour and speed of the cam 28 are designed to cooperate with the temperature sensitive bellows 21, for actuating switch 10 in a manner prolonging the predetermined period by a sufficient duration to effect sterilization regardless of temperature variations at the source. The timed duration will be proportional to temperature variations.

We shall now describe in detail the manner of computing and designing the contour of the cam 28. However, it will be understood that our invention is not restricted to any specific configuration but depends upon the selected timing period desired for a given temperature.

Since we elected to use a normally-open switch 10, it is necessary that the design of the characterized cam actuate and close the switch 10 substantially the entire time that the cam makes each revolution, providing the temperature in the sterilizing chamber 22 is maintained at the selected sterilizing temperature of 275° F. Also, the cam surface has to be designed to actuate and close the switch 10 a sufficient proportion of time for each revolution to give a total timed sterilizing period sufficient to effect sterilization at any of the temperature gradations between the selected maximum and the selected minimum. Therefore, the design of the contour of the cam 28 depends upon the stroke of the bellows 21 and upon the number of degrees of angular rotation or degree in the angular sector of the cam through which the switch 10 must be actuated, per each revolution of the cam 28, in order to complete a sterilizing cycle on the timer 5 for a given temperature at the source. In the illustrated embodiment, we have selected a cam 28 rotating at 4 r.p.m.

Assuming that the temperature of the sterilizing chamber is maintained at 275° F., then the switch 10 should be closed substantially 100% of the time, thereby completing the circuit to the timer 5 for a substantially continuous period of 3 minutes, during which the pointer 6 moves from the solid line position in 180 seconds to the broken line position 7.

These factors have been computed for the characterized embodiment of our invention as set forth in the chart below. In this chart, column 1 is the sterilizing temperature reading at the bulb 24. Column 2 gives the length of the stroke measured in inches of the linkage comprising the arm 12 and the extension 16 for the corresponding temperature in column 1. Column 3 shows the developed range of radial measurements of the cam in fractions of an inch necessary to close switch 10 at the corresponding temperature shown in column 1. Thus, a .005 inch decrease in the stroke of bellows 21 as a result of a 5° drop in temperature at the sterilizing chamber 22 requires an inversely proportional increase in the radius or stroke of the cam 28 by approximately .022 inch.

Column 4 designates each of the necessary angle sectors in degrees through which the switch 10 must be actuated per revolution of the cam 28 at the corresponding temperature in column 1. Column 5 gives the percentage of "time-on" of the switch 10 per revolution of the cam 28 at the corresponding temperature in column 1. Column 6 is the "time-on," in seconds, per revolution of the cam 28 when the bulb 24 is at the temperature indicated in column 1. Column 7 gives the total number of revolutions which the cam 28 will make during a sterilizing cycle at the temperature in column 1. Column 8 gives the total time in minutes of sterilization necessary, at the sterilizing temperature indicated in column 1, to effect complete sterilization.

| (1) | (2) | (3) | (4) | (5) | (6) | (7) | (8) |
|---|---|---|---|---|---|---|---|
| Bulb Temp. at 24 | Design of Linkage (12 and 14), Stroke at Bellows 22 | Design of Cam 28 in Inches, Developed Cam Radius from Testing | "Time-On" Angle Sector Switch | Percent of "Time-On" Per Rev. | Timing, 4 r.p.m. Cam | | Total Time Calculated, min. |
| | | | | | "Time-On" Per Rev., Sec. | No. Rev. to Total 3 Min. "On" | |
| 250° | .000″ | .450/.452 | 72° | 20 | 3 | 60 | *15 |
| 255° | .005″ | .428/.430 | 98° | 27 | 4.1 | 44 | *11 |
| 260° | .010″ | .406/.408 | 134° | 37 | 5.6 | 32 | *8 |
| 265° | .015″ | .384/.386 | 195° | 54 | 8.1 | 22.4 | *5.6 |
| 270° | .020″ | .362/.364 | 265° | 73 | 11.0 | 16.4 | *4.1 |
| 275° | .025″ | .340/.342 | 360° | 100 | 15 | 12 | *3.0 |
| Per 5° Rise_ | .005″ | .022″ | | | "Time-On" × "No. Rev." always equals 180 Sec. | | |

*These times correspond to required exposure times required to kill resistant bacteria (with steam) at temperatures in column #1.

Figure 2:
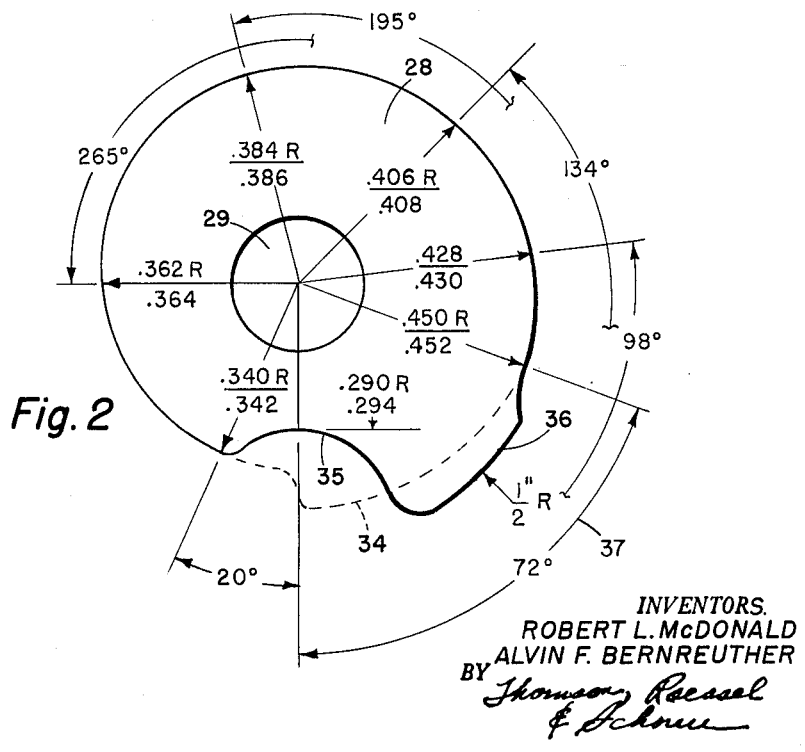
FIG. 2 is an enlarged detail planar view of the cam portion of the embodiment illustrated in FIG. 1.

The cam 28 shown in solid line in both the figures conforms substantially with this chart, whereas a cam conforming completely with the above chart is characterized in FIG. 2 by the broken line 34.

Although not essential to the conception of our invention, we have modified the cam 34 in accordance with the solid line cam 28 to compensate for two possible maladjustments. First of all, assuming that the temperature of the sterilizing chamber or source 22 was at a few degrees below the high temperature of 275° F. so that the follower roller 25 should open the switch 10 as it drops off of the high portion of the cam 34 onto the low portion of the cam 34; however, if the apparatus is slightly out of adjustment, the electrical switch 10 might not completely open but only "gap" the switch thereby burning and rapid wearing out the switch 10. Thus, we provide a recessed portion 35 of the cam 28, the low point of which has a radius of between .290 inch and .294 inch, thereby guaranteeing that the normally open switch 10 will click completely open at least once for every revolution of the cam even if the temperature at the source is at the high value of 275° F. This adds to the life of the switch.

Secondly, when the temperature of the chamber 22 is, at least, at the selected minimum temperature of 250° F. but not low enough to actuate the re-cycle switch 30, the roller 25 would normally engage the first 72° in the fourth quadrant of the cam 28 as indicated in FIG. 2 by the double headed arrow 37. In order to avoid any possibility that neither the switch 10 would be closed for a portion of each timed revolution of the cam 28 nor the recycle switch 30 would be actuated we have provided a raised portion 36 of ½ inch radius; this raised portion guarantees that, for each revolution of the cam 28, the follower roller 25 would, in the alternative, either be engaged by a cam to close the normally-open switch 10 for a selected minimum timing period of the re-cycle switch 30 would be actuated.

In summary, we provide the timer 5 for timing an established minimum period at a selected maximum temperature, such as for example, a 3 minute sterilizing cycle for 275° F. maximum sterilizing temperature. The pointer 6 on the timer 5 will move from the start-time position at 6 to the finish-time position shown in broken line at 7 in substantially not more than the 3 minutes while the temperature of the sterilizing chamber 22 is at the selected 275° F., as a result of the follower roller 25 engaging substantially 360° of the cam 28 per revolution thereof. Normally-open switch 10 is closed by engagement of the roller 25 and cam 28 to complete the circuit to the timer coil 8. The pointer 6 is moved to the finish-time position in a longer than minimum period of time if the current to the coil 8 is interrupted by the follower roller 25 falling off the cam 28 responsive to reduced temperature in the chamber 22. The proportionate "time-off" and "time-on" of the timer 5 during a single revolution of the cam 28 is a function of the position of the switch 10 relative to the cam 28. Thus, a long "time-on" period is provided when the temperature is relatively high and the switch 10 is positioned relatively near the cam 28 so that the follower roller 25 engages more of the contour of the cam 28 than would be true when the switch is positioned relatively far from the cam 28. The cam rotates at a constant speed by means of a synchronous motor (not shown) controlling the shaft 29 and in this manner line voltage fluctuations will not affect the accuracy of the proportional "time-on" or "time-off" periods provided by the cam 28. This overcomes one of the inherent disadvantages of known devices of this general nature.

While we have shown and described the preferred form of mechanism of our invention it will be apparent that various modifications and changes may be made therein, particularly in the form and relation of parts, without departing from the spirit of our invention as set forth in the appended claims.

We claim:

1. A time-temperature integrator apparatus comprising, in combination,
   (a) timer means set for a predetermined time,
   (b) control means responsive to the temperature at said source for interrupting said timer means, and
   (c) cam means cooperating with said control means to vary said predetermined period of time in accordance with variations in the temperature at said source.

2. Apparatus in accordance with claim 1 in which said control means comprises,
   (d) a temperature sensitive element being responsive to said source,
   (e) a switch in circuit with said timer being pivotally mounted relative to said cam means,
   (f) pivotal movement of said switch being controlled by said temperature sensitive element.

3. A time-temperature integrator apparatus comprising, in combination,
   (a) timer means set for a predetermined time,
   (b) switch means in circuit with said timer means and being responsive to the temperature at said source for interrupting said timer means,
   (c) rotating cam means cooperating with said switch means to vary said predetermined period of time in accordance with variations in the temperature at said source, and
   (d) said switch means includes means responsive to a preselected minimum temperature at said source for recycling said timer when the temperature at said source drops below said preselected minimum temperature.

4. A time-temperature integrator apparatus comprising, in combination,
   (a) timer set a predetermined time,
   (b) control means for interrupting said timer means,
   (c) rotatable cam means having a contour of selected substantially continuously different radii throughout its entire contour for actuating said control means, a selected period for a selected temperature condition, and
   (d) temperature sensitive means responsive to temperature at said source for moving one of said control and cam means relative to the other, thereby rendering said cam effective to actuate said control means for a selected length of time corresponding to a selected temperature at said source.

5. Apparatus in accordance with claim 4 in which,
   (e) the contour of said cam means is of selected configuration cooperating with said temperature sensitive means to vary said predetermined period of time a selected interval corresponding to a selected change in temperature at said source.

6. Apparatus in accordance with claim 4 in which,
   (e) the contour of said cam is of selected configuration cooperating with said temperature sensitive means to prolong said predetermined period of time a selected interval corresponding to a selected decrease in temperature at said source.

7. Apparatus in accordance with claim 3 including,
   (f) means between said switch and temperature sensitive means responsive to the ambient temperature of said temperature sensitive means for compensating for ambient temperature variations.

8. A time-temperature integrator apparatus for a sterilizer, comprising in combination,
   (a) an electrical timer indicating the completion of sterilization set for a predetermined period of time,
   (b) a pivotally mounted switch in circuit with said timer for interrupting the current to said timer,
   (c) a rotatable interrupter cam,
   (d) temperature sensitive means responsive to temperature in said chamber for pivoting said switch relative to said cam,
   (e) said cam having a contour of selected configuration cooperating with said temperature sensitive means to prolong said predetermined period of time by a selected interval sufficient to effect sterilization at a corresponding decrease in temperature in said chamber, 9. Timer apparatus comprising:
   (a) timer means set for a preselected period of time;
   (b) control means responsive to a selected condition for interrupting said timer means, and (c) cam means coactive with said control means to vary said preselected period of time in accordance with variations in said condition at said source.

References Cited by the Examiner

UNITED STATES PATENTS

| | | | |
|---|---|---|---|
| 2,488,572 | 11/1949 | Varney | 200—136.3 |
| 2,583,547 | 1/1952 | Cox | 310—4.1 |
| 2,697,332 | 12/1954 | Duncan | 200—136.3 |
| 2,744,337 | 5/1956 | Raney | 200—136.3 |
| 3,062,447 | 11/1962 | Quinn | 200—136.3 |

FOREIGN PATENTS 229,054  10/1958  Australia.

LLOYD McCOLLUM, Primary Examiner.

ROBERT L. SIMS, Examiner.